O. E. EVANS.
COMBINED SHACKLE AND SHOCK ABSORBER.
APPLICATION FILED MAY 1, 1917.

1,255,997. Patented Feb. 12, 1918.

Inventor
Otto E. Evans,
By C. L. Parker
Attorney

UNITED STATES PATENT OFFICE.

OTTO E. EVANS, OF YORK, NEBRASKA.

COMBINED SHACKLE AND SHOCK-ABSORBER.

1,255,997.         Specification of Letters Patent.    Patented Feb. 12, 1918.

Application filed May 1, 1917. Serial No. 165,689.

*To all whom it may concern:*

Be it known that I, OTTO E. EVANS, a citizen of the United States, residing at York, in the county of York and State of Nebraska, have invented certain new and useful Improvements in Combined Shackles and Shock-Absorbers, of which the following is a specification.

My invention relates to a combined spring shackle and shock absorber.

An important object of the invention is to provide a device of the above mentioned character, which will take up slight vibrations in a highly efficient manner.

A further object of the invention is to provide a device of the above mentioned character, which is simple in construction, inexpensive to manufacture, strong and durable.

Other objects and advantages of the invention will be apparent during the course of the following description.

Figure 1:
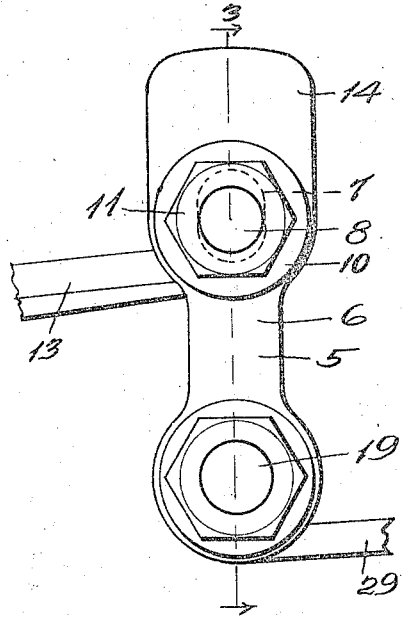
Figure 2:
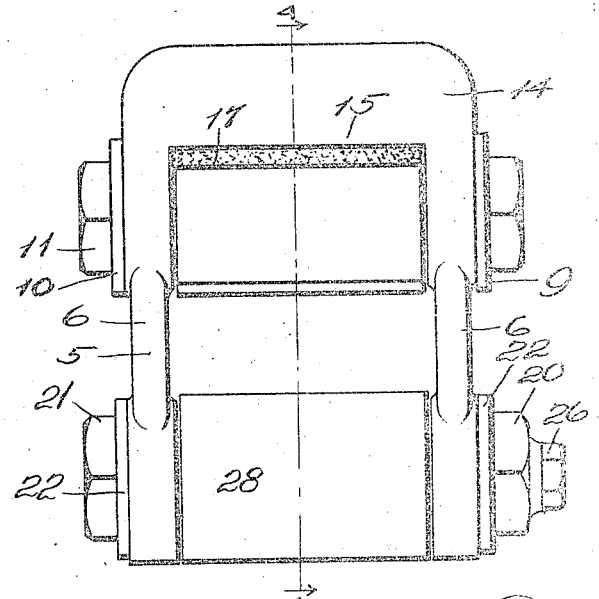
Figure 4:
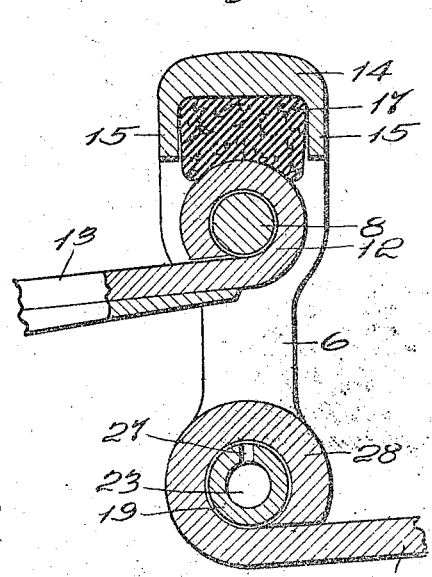
Figure 3:
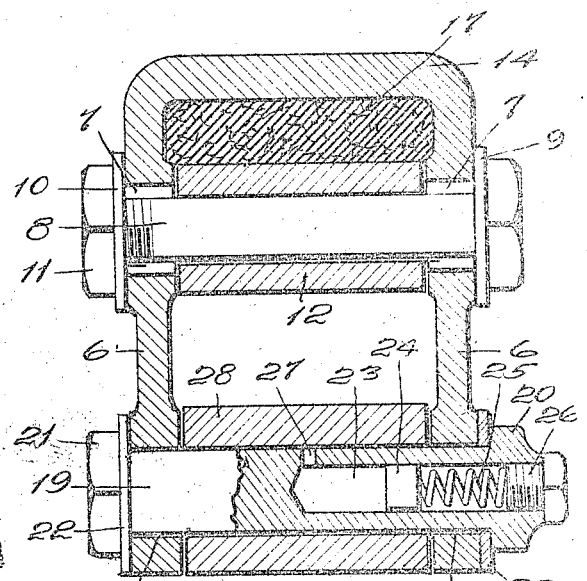

In the accompanying drawings forming a part of this specification and in which like numerals are employed to designate like parts throughout the same, Figure 1 is an edge elevation of a device embodying my invention, Fig. 2 is a side elevation of the same, Fig. 3 is a longitudinal sectional view taken on line 3—3 of Fig. 1, and, Fig. 4 is a transverse sectional view taken on line 4—4 of Fig. 2.

In the drawings, wherein for the purpose of illustration is shown a preferred embodiment of my invention, the numeral 5 designates the body portion of the shackle, which is inverted approximately U-shaped. This body portion or frame comprises sides 6, as shown.

Near their upper ends, the sides 6 are provided with vertical elongated openings 7, receiving an upper transverse bolt 8, which is thereby adapted to partake of slight vertical movements. A washer 9 is preferably arranged between the head of the bolt and one side 5 and a washer 10 is preferably arranged between the opposite side 5 and a nut 11 carried by the bolt 8. The bolt 8 pivotally receives an eye 12 carried by one end of a ¾ elliptic spring 13.

The upper transverse portion 14 of the frame 5 is provided with depending flanges 15 receiving therebetween a block of rubber 17 or member formed of suitably elastic material. The elastic member 17 has its lower surface in contact with the eye 12.

The sides 6 are provided near their ends with transverse openings 18, receiving a lower transverse bolt 19, having a head 20, and a nut 21. Arranged between this head and nut and the sides 6 are washers 22, as shown. The bolt 19 is provided with a longitudinal opening or bore 23, passing through one end thereof for the reception of a lubricant, such as grease. This lubricant is suitably compressed by means of a plunger 24, operating therein and moved inwardly by a spring 25 contacting with a screw-threaded plug 26, as shown. The bolt 19 is provided with a laterally extending discharge port 27, communicating with the bore 23.

Pivotally receiving the bolt 19 is an eye 28 of a ¾ elliptic spring 29. It is apparent that the lubricant within the bore 23 will discharge between the eye 28 and the bolt 19.

In operation, the weight of the spring 29 and its load, will be carried by the elastic member 17, and associated elements, whereby this elastic element will function to take up or absorb slight shocks.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A combined shackle and shock absorber, comprising an approximately U-shaped frame having spaced sides connected by a transverse portion carrying spaced flanges for providing a pocket, said sides being provided with elongated openings extending longitudinally thereof, a bolt mounted to move vertically within the elongated openings and adapted for the reception of the eye of a spring, an elastic block arranged within the pocket to contact with one side of the eye, a bolt connected with the spaced sides and provided with a longitudinal bore having a transverse port passing to the exterior thereof, and spring pressed means for compressing a lubricant within the bore.

In testimony whereof I affix my signature in presence of two witnesses.

OTTO E. EVANS.

Witnesses:
W. M. OVERSTREET,
W. W. WYCKOFF.